W. S. GRAFFAM.
ANTIRATTLING DEVICE FOR CONTROL RODS.
APPLICATION FILED MAY 2, 1917.

1,240,562.

Patented Sept. 18, 1917.

Inventor:
Walter S. Graffam,
by his attorney, Charles N. Gooding.

UNITED STATES PATENT OFFICE.

WALTER S. GRAFFAM, OF WEST NEWTON, MASSACHUSETTS.

ANTIRATTLING DEVICE FOR CONTROL-RODS.

1,240,562.　　　　　　Specification of Letters Patent.　　Patented Sept. 18, 1917.

Application filed May 2, 1917. Serial No. 165,818.

*To all whom it may concern:*

Be it known that I, WALTER S. GRAFFAM, a citizen of the United States, residing at West Newton, in the county of Middlesex and State of Massachusetts, have invented new and useful Improvements in Antirattling Devices for Control-Rods, of which the following is a specification.

This invention relates to a device for stopping the rattle of the spark and throttle control rods of automobiles.

The object of the invention is to provide a cheap, durable and simple means for stopping the annoying rattle caused by said throttle control rod and said spark control rod of an automobile when they become loose in their bearings, and further the object is to provide a device of the character set forth which can be readily and efficiently attached to said spark and throttle control rods.

Referring to the drawings.

Like numerals refer to like parts throughout the several views of the drawings.

Figure 1:
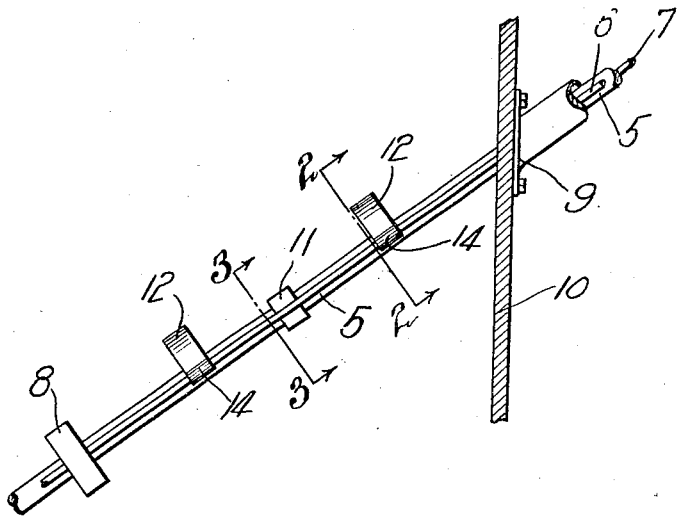
Figure 1 illustrates a side elevation, partly in section, of the spark and throttle control rods, with my improved silencer attached thereto.
Figure 3:
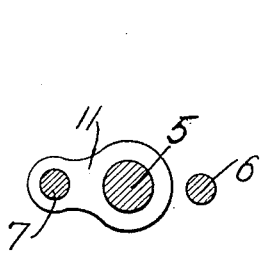
Fig. 3 is a sectional elevation taken on line 3—3 of Fig. 1.
Figure 2:
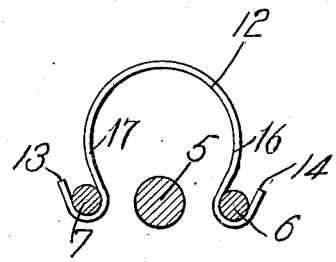
Fig. 2 is a sectional elevation taken on line 2—2 of Fig. 1.

In the drawings, 5 is the steering post, 6 the spark control rod and 7 the throttle control rod of an automobile. 8 is the bearing for the lower ends of the rods and 9 the bearing for the upper ends of the rods attached to the dashboard 10. A bracket 11 connects the throttle rod 7 to the steering post 5. A U-shaped spring 12 extends over the steering post 5 and terminates in hooks 13, 14 which engage the throttle control rod 7 and the spark control rod 6, respectively. Said spring 12 is placed under compression when it is attached to the rods 6 and 7, the free ends thereof tending to move apart and thus the rods 6 and 7 are forced against their bearings 8 and 9 and the rattle caused by the looseness of said rods 6 and 7 in the bearings is thus overcome.

In order to still further prevent the throttle control rod from rattling, a reinforcing bracket 11 is provided through which the throttle control rod 7 and the steering post 5 extend. Two of the springs 12 are preferably used, one being located between the bearing 8 and the bracket 11 and the other being located between the bracket 11 and the bearing 9.

It will be noted that the legs 16 and 17 of the U-shaped spring are nearer together where they contact with the rods 6 and 7 than they are immediately therebeyond, and by this construction the spring is held firmly in place, the hooks 13 and 14 preventing the spring from moving in one direction transversely of the rods 6 and 7 and the legs of the U preventing the spring from moving transversely of the rods 6 and 7 in the opposite direction.

Said springs 12 are readily attached by slipping the hooks 13 and 14 onto their respective rods 6 and 7 and after being so attached the action of the spring is to force the rods 6 and 7 against their bearings and thus stop the rattling of said rods.

Having thus described my invention, what I claim and desire by Letters Patent to secure is:

1. An automobile having, in combination, a steering post, a spark control rod and a throttle control rod located on opposite sides of said steering post, bearings for said rods and a U-shaped spring extending across said steering post and terminating at its opposite ends in hooks which engage said spark control rod and throttle control rod, whereby said rods are forced against their respective bearings.

2. An automobile having, in combination, a steering post, a spark control rod and a throttle control rod located on opposite sides of said steering post, bearings for said rods, a bracket connecting said throttle rod and steering post, and a U-shaped spring extending across said steering post and terminating at its opposite ends in hooks which engage said spark control rod and throttle control rod, whereby said rods are forced against their respective bearings.

3. An automobile having, in combination, a steering post, a spark control rod and a throttle control rod located on opposite sides of said steering post, bearings for said rods and a U-shaped spring extending across said steering post and terminating at its opposite ends in hooks which engage said spark control rod and throttle control rod, whereby said rods are forced against their respective bearings, the legs of said U- shaped spring being nearer together where they contact with said rods than they are immediately therebeyond.

4. A U-shaped spring terminating at its opposite ends in hooks, said hooks adapted to engage the spark control rod and throttle control rod of an automobile while said U-shaped spring is under compression.

In testimony whereof I have hereunto set my hand in presence of two subscribing witnesses.

WALTER S. GRAFFAM.

Witnesses:
SYDNEY E. TAFT,
HATTIE E. STRATTON.

Copies of this patent may be obtained for five cents each, by addressing the "Commissioner of Patents, Washington, D. C."